US012395561B2

(12) United States Patent
Li et al.

(10) Patent No.: US 12,395,561 B2
(45) Date of Patent: Aug. 19, 2025

(54) DATA PROCESSING METHOD AND SYSTEM

(71) Applicant: Hangzhou AliCloud Feitian Information Technology Co., Ltd., Hangzhou (CN)

(72) Inventors: Yuewu Li, Beijing (CN); Shanghui Liu, Beijing (CN)

(73) Assignee: Hangzhou AliCloud Feitian Information Technology Co., Ltd., Hangzhou (CN)

(*) Notice: Subject to any disclaimer, the term of this patent is extended or adjusted under 35 U.S.C. 154(b) by 0 days.

(21) Appl. No.: 18/685,216

(22) PCT Filed: Jan. 18, 2023

(86) PCT No.: PCT/CN2023/072760
§ 371 (c)(1),
(2) Date: Feb. 20, 2024

(87) PCT Pub. No.: WO2023/143275
PCT Pub. Date: Aug. 3, 2023

(65) Prior Publication Data
US 2025/0126174 A1 Apr. 17, 2025

(30) Foreign Application Priority Data
Jan. 30, 2022 (CN) .......................... 202210114721.X

(51) Int. Cl.
G06F 15/16 (2006.01)
H04L 67/142 (2022.01)
H04L 67/146 (2022.01)

(52) U.S. Cl.
CPC .......... H04L 67/142 (2013.01); H04L 67/146 (2013.01)

(58) Field of Classification Search
CPC .......................... H04L 67/142; H04L 67/146
See application file for complete search history.

(56) References Cited

U.S. PATENT DOCUMENTS 8,711,737 B2* 4/2014 Kandekar ............ G06F 3/0481
455/456.1
9,794,277 B2* 10/2017 Haelion ................ H04L 67/146
(Continued)

FOREIGN PATENT DOCUMENTS

CN 104601592 A 5/2015
CN 106210095 A 12/2016
(Continued)

OTHER PUBLICATIONS

Chinese Intellectual Patent Office; Notification of Grant of Patent Right issued in 202210114721.X dated May 3, 2024 with English translation.
(Continued)

Primary Examiner — Moustafa M Meky
(74) Attorney, Agent, or Firm — Maschoff Brennan

(57) ABSTRACT

The present disclosure discloses a data processing method and system. The method includes: acquiring first identification information of a first server, where the first identification information is used for identifying the first server; acquiring status information of the first server based on the first identification information, where the status information is used for indicating whether the first identification information has been collected by a target interface of an access device; in response to the status information indicating that the first identification information has not been collected by the target interface, transmitting the first identification information to the target interface to establish a first mapping relationship between the first server and the target interface based on the first identification information. The present application solves a technical problem.

20 Claims, 9 Drawing Sheets

(56) References Cited

U.S. PATENT DOCUMENTS

| | | | |
|---|---|---|---|
| 10,320,919 B2* | 6/2019 | Ding | H04L 67/146 |
| 10,778,678 B2* | 9/2020 | Song | H04L 63/0861 |
| 10,880,366 B1* | 12/2020 | Chen | H04L 67/10 |
| 10,937,043 B2* | 3/2021 | Splaine | H04L 67/535 |
| 10,972,861 B2* | 4/2021 | Yang | H04W 4/80 |
| 11,075,970 B2* | 7/2021 | Gordon | H04L 67/10 |
| 11,451,539 B2* | 9/2022 | Song | H04L 63/0861 |
| 11,733,343 B2* | 8/2023 | Han | G01S 5/02527 |
| | | | 342/451 |
| 2003/0018889 A1 | 1/2003 | Burnett et al. | |
| 2012/0063427 A1* | 3/2012 | Kandekar | G06Q 30/0261 |
| | | | 370/338 |
| 2016/0034317 A1 | 2/2016 | Nair et al. | |
| 2016/0036643 A1 | 2/2016 | Nair et al. | |
| 2016/0269491 A1* | 9/2016 | Eom | H04L 67/142 |
| 2016/0373534 A1* | 12/2016 | Fedronic | H04L 67/1095 |
| 2017/0094035 A1* | 3/2017 | Nakamura | H04L 67/142 |
| 2017/0180213 A1 | 6/2017 | Li et al. | |
| 2017/0280106 A1 | 9/2017 | Malik et al. | |
| 2018/0295193 A1* | 10/2018 | Ding | H04L 67/303 |
| 2019/0355003 A1* | 11/2019 | Splaine | G06Q 30/0204 |
| 2020/0204548 A1* | 6/2020 | Song | H04W 12/06 |
| 2021/0021593 A1* | 1/2021 | Song | H04L 63/0861 |
| 2021/0025966 A1* | 1/2021 | Han | G01S 5/02526 |

FOREIGN PATENT DOCUMENTS

| | | |
|---|---|---|
| CN | 106992885 A | 7/2017 |
| CN | 108259218 A | 7/2018 |
| CN | 109561054 A | 4/2019 |
| CN | 109656755 A | 4/2019 |
| CN | 110798329 A | 2/2020 |
| CN | 113934299 A | 1/2022 |
| CN | 114598735 A | 6/2022 |
| WO | 01/10073 A2 | 2/2001 |
| WO | 2016200889 A1 | 12/2016 |
| WO | 2017185925 A1 | 11/2017 |
| WO | 2019144826 A1 | 8/2019 |
| WO | 2021057530 A1 | 4/2021 |

OTHER PUBLICATIONS

China National Intellectual Property Administration; International Search Report and Written Opinion dated Apr. 28, 2023 issued in PCT Application No. PCT/CN2023/072760; 12 pages.

China National Intellectual Property Administration; Office Action issued in CN Application No. 202210114721.X dated Jan. 30, 2022; 9 pages.

* cited by examiner

DATA PROCESSING METHOD AND SYSTEM

CROSS-REFERENCE TO RELATED APPLICATIONS

The present application is a National Stage of International Application No. PCT/CN2023/072760, filed on Jan. 18, 2023, which claims priority to Chinese Patent Application No. 202210114721.X, filed to China National Intellectual Property Administration on Jan. 30, 2022 and titled "Data processing method and system", the entire contents of these applications are incorporated herein by reference.

TECHNICAL FIELD

The present application relates to the field of data processing, in particular to a data processing method and system.

BACKGROUND

At present, when a server accesses a cloud computing network, an access device acquires a mapping relationship by judging the connection status between the access device and the server, which requires the server to be powered off and is unreliable, and the establishment of the mapping relationship cannot be completed, and furthermore manual intervention is required. That is, there is a technical problem of low efficiency in establishing the mapping relationship between the server and the access device.

In view of the above problem, no effective solutions have been put forward at present.

SUMMARY

Embodiments of the present disclosure provide a data processing method and system for at least solving the technical problem of low efficiency in establishing a mapping relationship between a server and an access device.

According to one aspect of an embodiment of the present disclosure, a data processing method is provided, which comprises: acquiring first identification information of a first server, where the first identification information is used for identifying the first server: acquiring status information of the first server based on the first identification information, where the status information is used for indicating whether the first identification information has been collected by a target interface of an access device: in response to the status information indicating that the first identification information has not been collected by the target interface, transmitting the first identification information to the target interface to establish a first mapping relationship between the first server and the target interface based on the first identification information.

According to one aspect of an embodiment of the present disclosure, another data processing method is further provided, which comprises: receiving first identification information of a first server, where the first identification information is used for identifying the first server and the first identification information has not been collected by a target interface of an access device but sent by the first server; establishing a first mapping relationship between the first server and the target interface based on the first identification information.

According to another aspect of an embodiment of the present disclosure, a data processing apparatus is provided, which comprises a first acquiring unit configured to acquire first identification information of a first server, where the first identification information is used for identifying the first server: a second acquiring unit configured to acquire status information of the first server based on the first identification information, where the status information is used to indicate whether the first identification information has been collected by a target interface of an access device; a first establishing unit configured to transmit the first identification information to the target interface in response to the status information indicating that the first identification information has not been collected by the target interface, so as to establish a first mapping relationship between the first server and the target interface based on the first identification information.

According to another aspect of an embodiment of the present disclosure, another data processing apparatus is provided, which comprises a receiving unit configured to receive first identification information of a first server, where the first identification information is used for identifying the first server and the first identification information has not been collected by a target interface of an access device but sent by the first server: a second establishing unit configured to establish a first mapping relationship between the first server and the target interface based on the first identification information.

According to another aspect of an embodiment of the present disclosure, a data processing system is provided, which comprises a server and an access device, where the server is configured to acquire identification information, acquire status information of the server based on the identification information, and in response to the status information indicating that the identification information has not been collected by a target interface of the access device, transmit the identification information to the target interface, where the identification information is used for identifying the server; an access device configured to establish a first mapping relationship between the server and the target interface based on the identification information having been received by the target interface and further based on the identification information.

An embodiment of the present application further provides a computer-readable storage medium. The computer-readable storage medium comprises a stored program, where when the program is run by a processor, a device where the computer-readable storage medium is located is controlled to perform the data processing method of an embodiment of the present disclosure.

An embodiment of the present application further provides a processor. The processor is configured to run a program, where the data processing method of an embodiment of the present disclosure is performed when the program runs.

An embodiment of the present application further provides a data processing system, which can comprise a processor: a memory connected with the processor and configured to provide an instruction for the processor to process the following processing steps: acquiring first identification information of a first server, where the first identification information is used for identifying the first server: acquiring status information of the first server based on the first identification information, where the status information is used for indicating whether the first identification information has been acquired by a target interface of an access device: in response to the status information indicating that the first identification information has not been collected by the target interface, transmitting the first identification information to the target interface to establish a first mapping relationship between the first server and the target interface based on the first identification information.

In an embodiment of the present disclosure, an automatic collecting mode is adopted. By acquiring a first identification information of a first server, where the first identification information is used for identifying the first server: acquiring status information of the first server based on the first identification information, where the status information is used for indicating whether the first identification information has been collected by a target interface of an access device: in response to the status information indicating that the first identification information has not been collected by the target interface, transmitting the first identification information to the target interface to establish a first mapping relationship between the first server and the target interface based on the first identification information, that is, in the present application, by collecting the identification information of the server, recording whether the identification information of the server has been collected by the target interface of the access device, and then transmitting the identification information to the target interface to establish the mapping relationship between the target interface and the server; the collecting is automatic since the server does not need to be powered down, so that the efficiency in establishing the mapping relationship between the server and the access device is improved, thereby solving the technical problem of low efficiency in establishing the mapping relationship between the server and the access device and achieving the technical effect of improving the efficiency in establishing the mapping relationship between the server and the access device.

BRIEF DESCRIPTION OF DRAWINGS

The accompanying drawings described here are used to provide a further understanding of the disclosure and are a part of the present application. The illustrative embodiments of the disclosure and descriptions thereof are used to explain the present disclosure and do not constitute an undue limitation of the present disclosure. In which.

DESCRIPTION OF EMBODIMENTS

Figure 1:
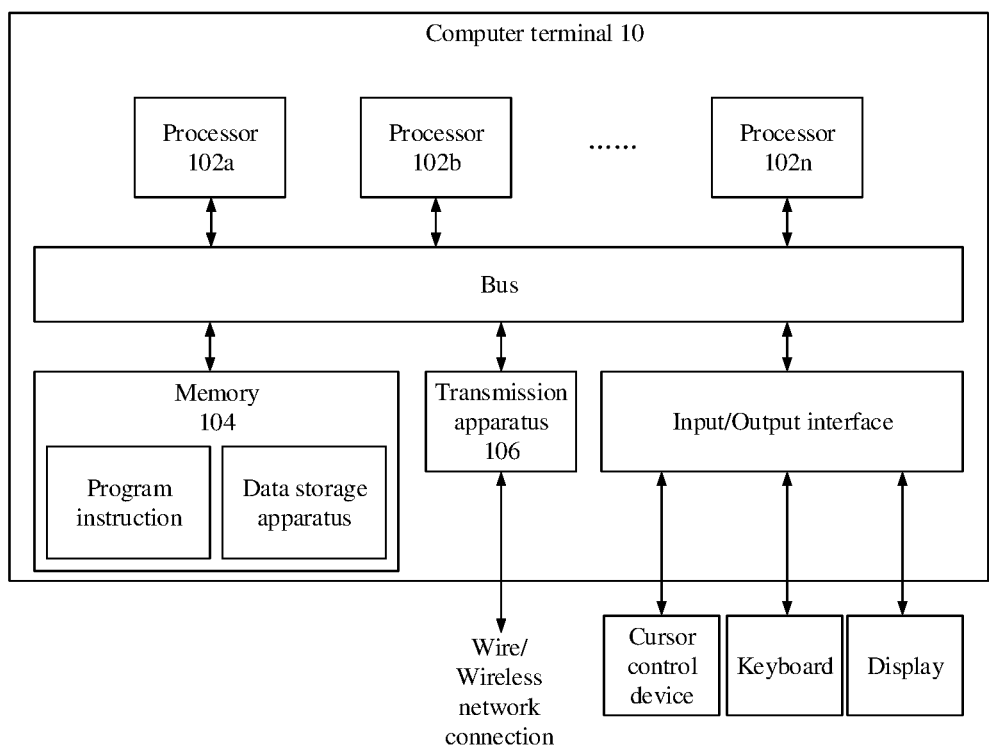
FIG. 1 is a hardware structure block diagram of a computer terminal (or mobile device) for implementing a data processing method according to an embodiment of the present disclosure.

In order to make those skilled in the art better understand the scheme of the present disclosure, the technical scheme in an embodiment of the present disclosure will be described clearly and completely with the accompanying drawings thereof. Obviously, the described embodiment is only a part of the embodiments of the present disclosure, but not all of the embodiments. Based on the embodiments in the present disclosure, all other embodiments obtained by ordinary technicians in the art without creative work should belong to the protection scope of the present disclosure.

It should be noted that the terms "first" and "second" and the like in the description and claims of the present disclosure and the above accompanying drawings are used to distinguish similar objects, and are not necessarily used to describe a specific order or sequence. It should be understood that the data thus used are interchangeable under appropriate circumstances, so that the embodiments of the present disclosure described herein can be implemented in other orders than those illustrated or described herein. Furthermore, the terms "include" and "have" and any variations thereof are intended to cover non-exclusive inclusion, for example, a process, method, system, product or device that includes a series of steps or units is not necessarily limited to those explicitly listed, but may include other steps or units not explicitly listed or inherent to such process, method, product or device.

First of all, some nouns or terms appearing in the process of describing an embodiment of the application are applicable to the following explanations:

Neighbor discovery protocol, which is a part of transmission control protocol (TCP) or Internet protocol (IP) protocol stack, is mainly used together with Internet protocol version 6 (IPV6). It works at the network layer and is responsible for discovering other nodes and corresponding addresses on a link, and determining an available route and maintaining information accessibility about an available path and other active nodes.

Baseboard Management Controller (BMC for short) is configured to perform a remote management controller of a server, which can upgrade the firmware of a machine, check a machine device and other operations when the machine is not turned on.

Central Processing Unit (CPU for short), as the operation and control center of a computer system, is a final execution unit of information processing and program operation.

Field Programmable Gate Array (FPGA for short) is a semi-custom circuit in ASIC, which can effectively solve the problem of less gate circuits in an original equipment.

Peripheral Component Interconnect Express (PCIE for short) belongs to high-speed serial peer to peer dual-channel high-bandwidth transmission.

Peer to Peer communication realizes information exchange between any two users in the network.

Embodiment 1

According to an embodiment of the present disclosure, there is further provided an embodiment of a data processing method. It should be noted that steps shown in a flowchart of an accompanying drawing can be performed in a computer system such as a set of computer-executable instructions, and although a logical order is shown in the flowchart, in some cases, the steps shown or described can be performed in a different order from here.

The method embodiment provided in Embodiment 1 of the present application can be performed in a mobile terminal, a computer terminal or a similar computing apparatus. FIG. 1 shows a hardware structure block diagram of a computer terminal (or mobile device) for implementing a data processing method. As shown in FIG. 1, a computer terminal 10 (or mobile device 10) may include one or more (102a, 102b, . . . , 102n as shown in the figure) processors 102 (processor 102 may include but are not limited to a processing apparatus such as a microprocessor MCU or a programmable logic equipment FPGA), a memory 104 for storing data, and a transmission apparatus 106 for a communication function. Besides, it can further include a display, an input/output interface (I/O interface), a universal serial bus (USB) port (which can be included as one of the ports of the I/O interface), a network interface, a power supply and/or a camera. It can be understood by those skilled in the art that the structure shown in FIG. 1 is only schematic and does not limit the structure of the electronic apparatus. For example, the computer terminal 10 may further include more or fewer components than those shown in FIG. 1, or has a different configuration from that shown in FIG. 1.

It should be noted that the one or more processors 102 and/or other data processing circuits described above may generally be referred to herein as "data processing circuit". The data processing circuit can be fully or partially embodied as a software, a hardware, a firmware or any other combinations. In addition, the data processing circuit may be a single independent processing module, or be fully or partially incorporated into any one of other elements in the computer terminal 10 (or mobile device). As involved in an embodiment of the present application, the data processing circuit serves as a processor control (such as a selection of a variable resistance terminal path connected with an interface).

The memory 104 can be configured to store a software program and a module of an application software, such as a program instruction/data storage apparatus corresponding to the data processing method in an embodiment of the present disclosure. The processor 102 performs various functional applications and data processing by running the software program and module stored in the memory 104, that is, the above data processing method is implemented. The memory 104 may include a high-speed random access memory, and may further include a non-volatile memory, such as one or more magnetic storage apparatuses, flash memory, or other non-volatile solid-state memories. In some examples, the memory 104 may further include memories remotely located with respect to the processor 102, and these remote memories may be connected to the computer terminal 10 through a network. Examples of the above networks include, but are not limited to, the Internet, an intranet, a local area network, a mobile communication network, and combinations thereof.

The transmission apparatus 106 is configured to receive or transmit data via a network. The specific example of the network mentioned above may include a wireless network provided by a communication provider of the computer terminal 10. In one example, the transmission apparatus 106 includes a network interface controller (NIC), which can be connected with other network devices through a base station so as to communicate with the Internet. In one example, the transmission apparatus 106 may be a radio frequency (RF) module, which is configured to communicate with the Internet in a wireless manner.

The display may be, for example, a touch screen type liquid crystal display (LCD) that enables a user to interact with the user interface of the computer terminal 10 (or mobile device).

It should be noted here that in some alternative embodiments, the computer device (or mobile device) shown in FIG. 1 above may include a hardware element (including a circuit), a software element (including computer code stored on a computer-readable medium), or a combination of a hardware element and a software element. It should be noted that FIG. 1 is only one example of a specific example, and is intended to show a type of a component that may exist in the above-mentioned computer device (or mobile device).

Figure 2:
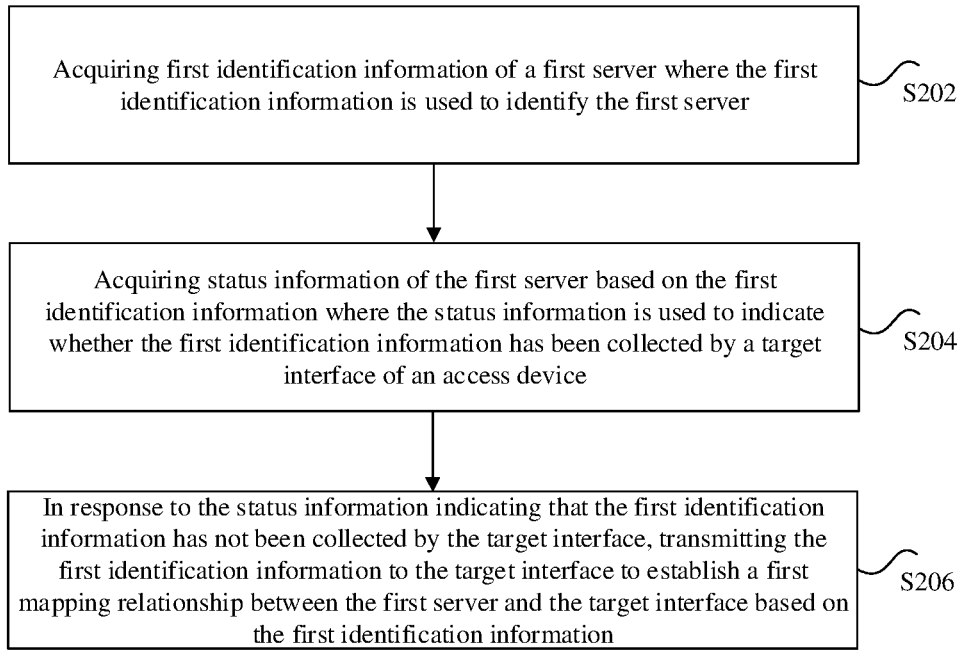
FIG. 2 is a flowchart of a data processing method provided from a server side according to an embodiment of the present disclosure.

FIG. 2 is a flowchart of a data processing method provided from a server side according to an embodiment of the present disclosure. As shown in FIG. 2, the data processing method may include the following steps:

Step S202: acquiring first identification information of a first server where the first identification information is used to identify the first server.

In the technical scheme provided in the above step S202 of the present disclosure, a network card or a field programmable gate array (FPGA) can be inserted into a PCIE slot of the server to connect with the CPU so as to dock with a cloud computing access device. A baseboard management controller can exist on the server for out-of-band management of the server, and a BMC can access the central processor of the server through the PCIE. That is, the network card, the FPGA and the BMC are all terminal nodes located on the PCIE bus of the CPU. Information collecting component exists on the network card or the FPGA, and server key information such as a serial number (SN for short) can exist on the BMC.

In this embodiment, the first identification information of the first server is acquired. For example, after the first server is connected to the cloud computing access device, the first server is powered on, and the CPU of the first server scans a PCIE device to find the network card or the FPGA and the BMC, and the information collecting component of the network card or the FPGA and the BMC communicate peer to peer through the PCIE bus so as to acquire server information recorded on the BMC and save the server information.

In this embodiment, the first identification information may be server information, and the server information may be SN information of the server.

In this embodiment, acquiring the first identification information of the first server, and the method may include: transmitting an information collecting instruction to a target controller of the first server: acquiring the first identification information returned by the target controller in response to the information collecting instruction.

Step S204: acquiring status information of the first server based on the first identification information where the status information is used to indicate whether the first identification information has been collected by a target interface of an access device.

In the technical scheme provided in the above step S204 of the present disclosure, the in-band neighbor discovery protocol can be used for CPU on the cloud computing access device to acquire server information stored in an information collecting apparatus of the network card or the FPGA on the server, and can acquire status information of the first server based on the first identification information. For example, after the information collecting component on the network card or the FPGA collects the first identification information, the information involving server is actively notified to an interface of the access chip of the access device corresponding to the first server through the in-band neighbor discovery protocol. After receiving the notification from the network card or the FPGA, the access chip notifies CPU in the form of interruption. After receiving the interruption, the CPU on the cloud computing access device performs a neighbor discovery program, and the neighbor discovery program receives a message packet and parses it, thus the status information of the first server is acquired.

In this embodiment, acquiring the status information of the first server based on the first identification information may include storing the first identification information in a memory, and seeking out the status information corresponding to the first identification information in the memory.

Step S206: in response to the status information indicating that the first identification information has not been collected by the target interface, transmitting the first identification information to the target interface to establish a first mapping relationship between the first server and the target interface based on the first identification information.

In the technical scheme provided in the above step S206 of the present disclosure, an information reporting module in the information collecting apparatus of the network card or the FPGA on the server can be configured to report the collected server information to the cloud computing access device, judge a server information tag before reporting, and report the server information to the cloud computing access device if the tag indicates that the server information has not been collected.

In this embodiment, in response to the status information indicating that the first identification information has not been collected by the target interface, the first identification information is be transmitted to the target interface, so as to establish a first mapping relationship between the first server and the target interface based on the first identification information. For example, the information reporting module in the information collecting apparatus of the network card or the FPGA on the server judges that the tag indicates that the server information has not been collected, and transmits the status information of the server as a signal that it has not been collected. In response to the signal, the first identification information is transmitted to the target interface of the access device corresponding to the first server, so as to establish a first mapping relationship between the first server and the target interface based on the first identification information.

Through the above steps S202 to S206 of the present application, a first identification information of a first server is acquired where the first identification information is used to identify the first server: status information of the first server is acquired based on the first identification information where the status information is used for indicating whether the first identification information has been collected by a target interface of an access device: in response to the status information indicating that the first identification information has not been collected by the target interface, the first identification information is transmitted to the target interface to establish a first mapping relationship between the first server and the target interface based on the first identification information. That is, in the present application, by collecting the identification information of the server, recording whether the identification information of the server has been collected by the target interface of the access device, and then transmitting the identification information to the target interface to establish the mapping relationship between the target interface and the server: the collecting is automatic since the server does not need to be powered down, so that the efficiency in establishing the mapping relationship between the server and the access device is improved, thereby solving the technical problem of low efficiency in establishing the mapping relationship between the server and the access device and achieving the technical effect of improving the efficiency in establishing the mapping relationship between the server and the access device.

The above method of this embodiment will be further introduced below.

As an alternative implementation, in step S206, the method further includes: in response to the status information indicating that the first identification information has been collected by the target interface, prohibiting the first identification information from being transmitted to the target interface.

In this embodiment, in response to the status information indicating that the first identification information has been collected by the target interface, it is prohibited to transmit the first identification information to the target interface. For example, the information reporting module in the information collecting apparatus of the network card or the FPGA on the server judges that the tag indicates that the server information has been collected, and transmits the status information of the server as a signal that it has been collected. In response to the signal, the server information will not be reported to the cloud computing access device, and it is prohibited to transmit the first identification information to the target interface.

In this embodiment, the target interface may be an interface of an access chip corresponding to the first server on the cloud computing access device.

As an alternative implementation, in response to the status information indicating that the first identification information has been collected by the target interface, prohibiting the first identification information from being transmitted to the target interface includes: in response to the first server being in a hot restart status and retaining the status information indicating that the first identification information has been collected by the target interface, prohibiting the first identification information from being transmitted to the target interface.

In this embodiment, the hot start status can be a status in which the network card/FPGA is not powered off, and the status information of the server is stored in a volatile storage, and if the server is hot restarted, the status information of the server is always retained.

In this embodiment, when the first server is in a hot restart status, and the status information used to indicate that the first identification information has been collected by the target interface is stored in the volatile storage, the first identification information is prohibited from being transmitted to the target interface in response to the signal.

As an alternative implementation, in step S206, in response to the status information indicating that the first identification information has not been collected by the target interface, transmitting the first identification information to the target interface includes: in response to the first server being in a cold restart status and the status information indicating that the first identification information has not been collected by the target interface, transmitting the first identification information to the target interface.

In this embodiment, the cold restart can be a status that the server is powered off. If the server is cold restarted, the status information of the server will disappear, and the server will still report the server information to the cloud computing access device after the server is powered on next time.

In this embodiment, when the first server is in a cold restart status and the status information is used to indicate that the first identification information has not been collected by the target interface, the first identification information is transmitted to the target interface in response to the signal.

As an alternative implementation, in step S202, acquiring the first identification information of the first server includes: transmitting an information collecting instruction to a target controller of the first server: acquiring the first identification information returned by the target controller in response to the information collecting instruction.

In this embodiment, the target controller may be a baseboard management controller (BMC) of the server.

In this embodiment, a PCIE transceiver module in the information collecting apparatus of the network card or the FPGA on the server is configured to receive and transmit a PCIE message.

In this embodiment, an information collecting instruction is transmitted to the target controller of the first server. For example, the information collecting instruction is transmitted to the baseboard management controller (BMC) of the first server through PCIE P2P communication between the information collecting apparatus of the network card or the FPGA and the BMC.

In this embodiment, a message organizing and parsing module in the information collecting apparatus of the network card or the FPGA on the server is configured to assemble and parse an information collecting message. When the network card or the FPGA collects server information, the module assembles a request message, and when a message returned by an information collecting response apparatus is received, the module parses a response message and extracts the server information.

In this embodiment, the first identification information returned by the target controller in response to the information collecting instruction is acquired. For example, an information collecting response apparatus on the BMC returns information requested by the network card or the FPGA after receiving the response.

As an alternative implementation, transmitting the information collecting instruction to the target controller of the first server includes: in the network card or the processor of the first server, transmitting the information collecting instruction to the target controller based on peer to peer communication between the network card or the processor of the first server and the target controller: acquiring the first identification information returned by the target controller in response to the information collecting instruction includes: in the network card or the processor, receiving the first identification information returned by the target controller in response to the information collecting instruction based on the peer to peer communication.

In this embodiment, the processor may be an FPGA.

In this embodiment, the peer to peer communication can be PCIE P2P communication between the network card or the FPGA on the server and the BMC.

In this embodiment, in the network card or the processor of the first server, the information collecting instruction can be transmitted to the target controller based on the peer to peer communication between the network card or the processor of the first server and the target controller. For example, the information collecting instruction can be transmitted to an interface of the access chip of the cloud computing access device corresponding to the first server through the PCIE P2P communication between an information collecting component on the network card or the FPGA of the first server and the BMC.

In this embodiment, in the network card or the processor, the first identification information returned by the target controller in response to the information collecting instruction can be received based on the peer to peer communication. For example, the information collecting response apparatus on the BMC returns information requested by the network card or the FPGA after receiving the response through the PCIE P2P communication between the information collecting component on the network card or the FPGA of the first server and the BMC.

As an alternative implementation, transmitting the first identification information to the target interface includes: transmitting the first identification information to the target interface through a target protocol based on a target message interaction protocol. If a network card is disposed in the first server, the target message interaction protocol is a message protocol for interaction based on Ethernet: if a processor is disposed in the first server, the target message interaction protocol is a message protocol for interaction based on a target serial bus.

In this embodiment, the target protocol can be a neighbor discovery protocol, which is a part of the transmission control protocol (TCP) or Internet protocol (IP) protocol stack and is mainly used together with IPV6. It works at the network layer and is responsible for discovering other nodes and corresponding addresses on a link, and determining an available route and maintaining information accessibility about an available path and other active nodes.

In this embodiment, the target serial bus can be a PCIE bus, which is a high-speed serial peer to peer dual-channel high-bandwidth transmission bus.

In this embodiment, if a network card is disposed in the first server, the target message interaction protocol is a message protocol for interaction based on Ethernet. For example, if a network card is installed on the server, the neighbor discovery protocol is a message interaction based on Ethernet.

In this embodiment, if a processor is disposed in the first server, the target message interaction protocol is a message protocol for interaction based on a target serial bus. For example, if an FPGA is installed on the server, the neighbor discovery protocol is a message interaction based on PCIE.

As an alternative implementation, in step S204, acquiring the status information of the first server based on the first identification information includes: storing the first identification information in a memory, and seeking out the status information corresponding to the first identification information in the memory.

In this embodiment, the first identification information can be stored in the memory, and the status information corresponding to the first identification information can be sought out in the memory. For example, an information storage module in the information collecting apparatus of the network card or the FPGA on the server is configured to store the server information parsed by the message organizing and parsing module in an apparatus, and at the same time, it is configured to record a tag whether the server information has been successfully collected.

In this embodiment, a storage medium of the first identification information may be a volatile storage medium.

As an alternative implementation, after transmitting the first identification information to the target interface, the method further includes: receiving a response result returned by the access device where the response result is used to indicate that the first identification information has been collected by the target interface: updating the status information based on the response result where the updated status information is used to indicate that the first identification information has been collected by the target interface.

In this embodiment, the response result returned by the access device is received where the response result is used to indicate that the first identification information has been collected by the target interface. For example, after receiving the response message packet, the network card or the FPGA on the server parses and acquires information of the cloud computing access device, records the status of the server information as having been collected, and the information reporting module reports the collected server information to the cloud computing access device.

In this embodiment, the status information can be updated based on the response result where the updated status information is used to indicate that the first identification information has been collected by the target interface. For example, after receiving the response packet of the cloud computing access device, the information collecting apparatus of the network card or the FPGA on the server records a status identifying the server information has been collected, and then updates the status information of the server in the information storage module. The server information will not be reported to the cloud computing access device after the server is hot restarted next time.

In an embodiment of the present disclosure, collecting the identification information of the server, recording whether the identification information of the server has been collected by the target interface of the access device, and then transmitting the identification information to the target interface to establish the mapping relationship between the target interface and the server: the collecting is automatic since the server does not need to be powered down, so that the efficiency in establishing the mapping relationship between the server and the access device is improved, thereby solving the technical problem of low efficiency in establishing the mapping relationship between the server and the access device and achieving the technical effect of improving the efficiency in establishing the mapping relationship between the server and the access device.

An embodiment of the present application further provides another data processing method from the access device side.

Figure 3:
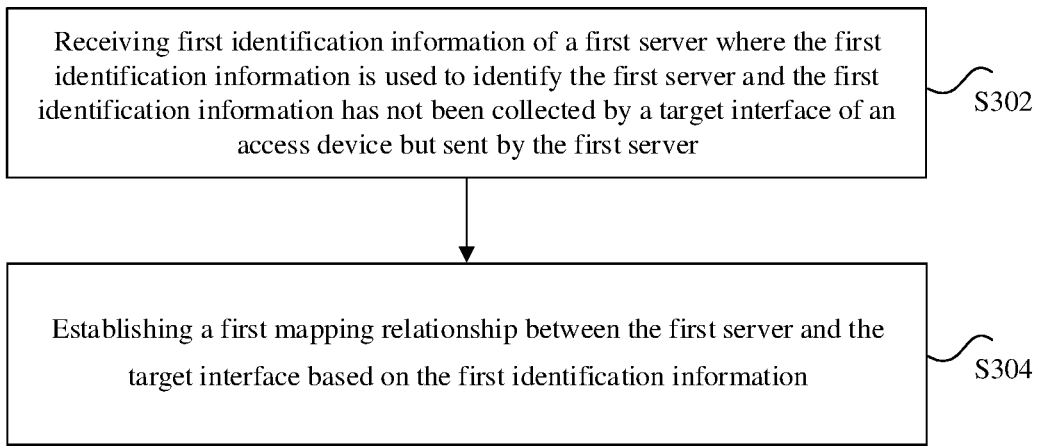
FIG. 3 is a flowchart of a data processing method provided from an access device side according to an embodiment of the present disclosure.

FIG. 3 is a flowchart of a data processing method provided from an access device side according to an embodiment of the present disclosure. As shown in FIG. 3, the method may include the following steps:

Step S302: receiving first identification information of a first server where the first identification information is used to identify the first server and the first identification information has not been collected by a target interface of an access device but sent by the first server.

In the technical scheme provided in the above step S302 of the present disclosure, after the information collecting component on the network card or the FPGA collects the server information, the information involving server is actively notified to an interface of an access chip through the in-band neighbor discovery protocol. After receiving the notification from the network card or the FPGA, the access chip of the cloud computing access device notifies CPU in the form of interruption. After receiving the interruption, the CPU on the cloud computing access device performs a neighbor discovery program, and the neighbor discovery program receives a message packet and parses it, thus the first identification information of the server is acquired.

Step S304: establishing a first mapping relationship between the first server and the target interface based on the first identification information.

In the technical scheme provided in the above step S304 of the present disclosure, the CPU on the cloud computing access device obtains information of the server from the interface of the access chip, and establishes a mapping relationship between the interface and the current server by judging whether there is a mapping relationship between the interface and the current server.

The above method of this embodiment will be further introduced below.

As an alternative implementation, in step S304, establishing the first mapping relationship between the first server and the target interface based on the first identification information includes: in response to there being a second mapping relationship between the target interface and a second server and second identification information of the second server corresponding to the second mapping relationship being different from the first identification information, deleting the second mapping relationship and establishing the first mapping relationship between the first server and the target interface, where the second identification information is used to identify the second server: or in response to there being no second mapping relationship between the target interface and the second server, establishing the first mapping relationship between the first server and the target interface.

In this embodiment, the cloud computing access device judges whether there is a mapping relationship between the current interface and the server information. If a result of the judgement is yes, deleting the old mapping relationship and establishing a new mapping relationship: if the result of the judgement is no, establishing a mapping relationship between the interface and the server.

As an alternative implementation, in step S302, receiving the first identification information of the first server includes: receiving the first identification information based on a target message interaction protocol. If a network card is disposed in the first server, the target message interaction protocol is a message protocol for interaction based on Ethernet: if a processor is disposed in the first server, the target message interaction protocol is a message protocol for interaction based on a target serial bus.

In this embodiment, if a network card is installed on the server, the neighbor discovery protocol is message interaction based on Ethernet: if an FPGA is installed on the server, the neighbor discovery protocol is a message interaction based on PCIE.

In an embodiment of the present disclosure, for a receiving device, a first identification information of a first server is received where the first identification information is used to identify the first server and the first identification information has not been collected by a target interface of an access device but sent by the first server: a first mapping relationship between the first server and the target interface is established based on the first identification information, so that the efficiency in establishing the mapping relationship between the server and the access device is improved, thereby solving the technical problem of low efficiency in establishing the mapping relationship between the server and the access device and achieving the technical effect of improving the efficiency in establishing the mapping relationship between the server and the access device.

Embodiment 2

The preferred implementation of the above method of this embodiment will be further introduced below.

Figure 4:
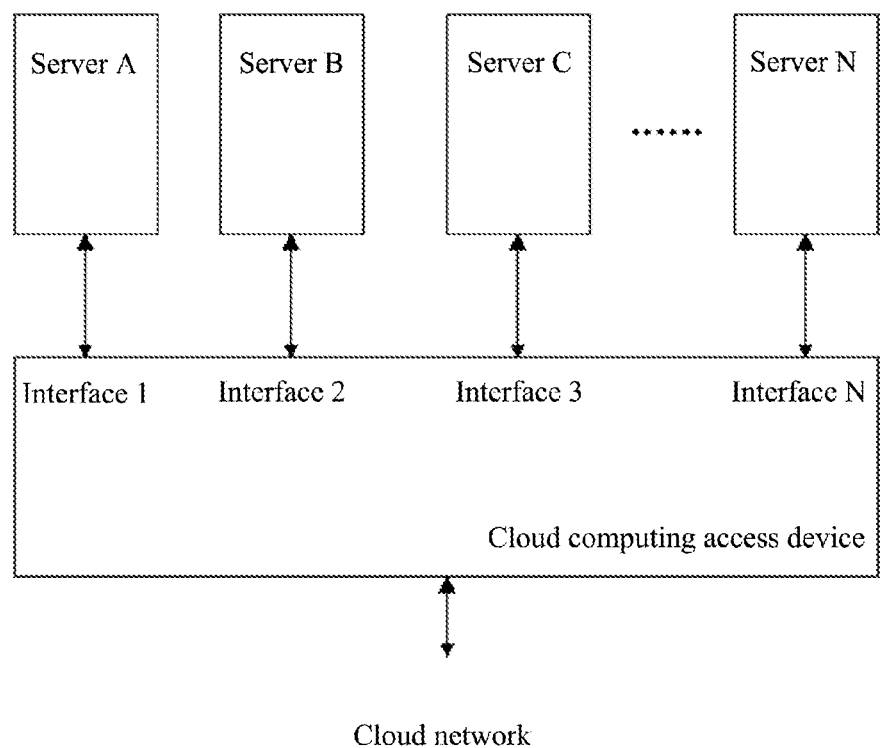
FIG. 4 is a schematic diagram of a method for accessing a cloud computing network by a plurality of servers according to an embodiment of the present disclosure.

FIG. 4 is a schematic diagram of a method for accessing a cloud computing network by a plurality of servers according to an embodiment of the present disclosure. As shown in FIG. 4, a plurality of servers are connected to one cloud computing access device, and the cloud computing access device is communicated with a cloud network, and a cloud computing access device mainly realizes a function such as management and control, security, network and the related function which required for a server to access the cloud network. Server A is connected to interface 1 of the cloud computing access device, and so on, server N is connected to cloud computing access device N. The cloud computing access device manages servers in a "one-to-many" way, and needs to acquire the corresponding relationship between a server and an interface; that is, the cloud computing access device needs to make clear that server A is connected to interface 1, server B is connected to interface 2, . . . , and server N is connected to interface N. The cloud computing access device acquires the corresponding relationship between a server and an interface, which is configured to set the corresponding interface configuration for the server to access the cloud network after the server is sold.

Figure 5:
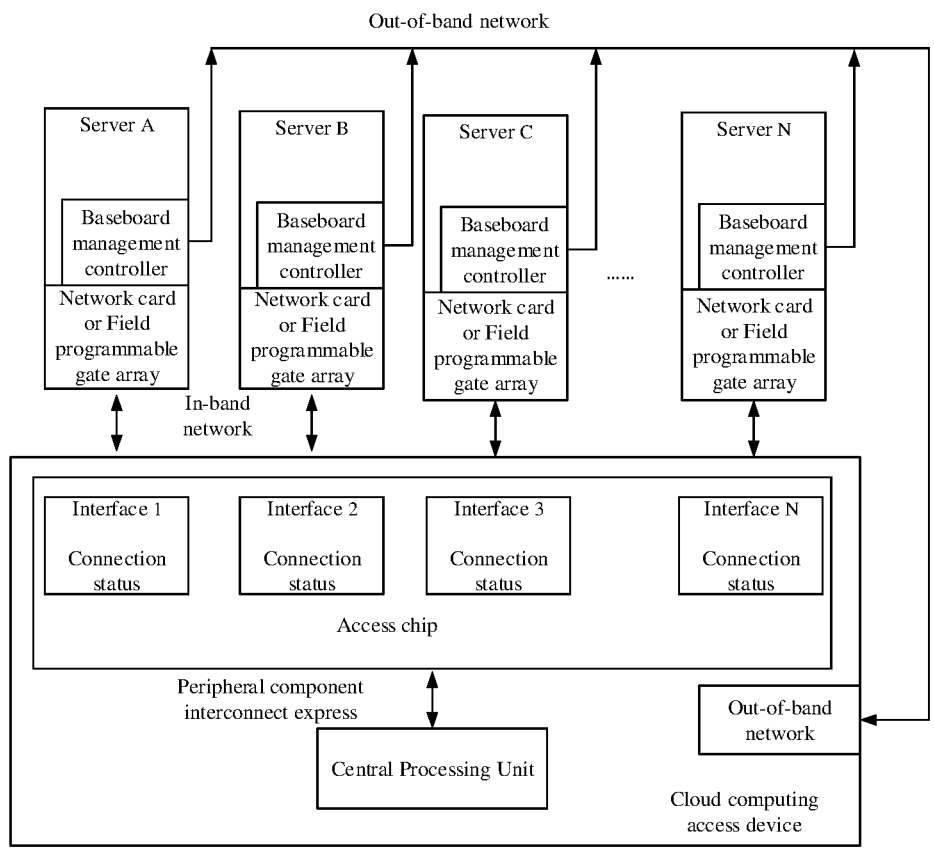
FIG. 5 is a schematic diagram of a connection scheme between a server and a cloud computing access device in the prior art according to an embodiment of the present disclosure.

FIG. 5 is a schematic diagram of a connection scheme between a server and a cloud computing access device in the prior art according to an embodiment of the present disclosure. As shown in FIG. 5, the specific connection scheme of the server and the cloud computing access device includes an in-band network and an out-of-band network. The in-band network, i.e. a network card or the FPGA, is interconnected with an access chip (the access chip can be a switching chip, an FPGA or CPU, etc.) in the cloud computing access device. The out-of-band network, i.e. the BMC on the server, is connected with the out-of-band (OOB for short) network of the cloud computing access device.

The existing method for the cloud computing access device to acquire the corresponding relationship between the server and the interface is identifying by detect the link (Link) status of an interface of an access chip.

A specific process can be:
  step 1, scanning an IP address in the OOB network, and identifying the number of devices accessing to the current cloud computing access device, and making all servers be powered on through an out-of-band command;
  step 2, waiting for a period of time until that the servers are in stable power-on, and acquiring a Link status value of an interface of an access chip in the power-on status of each of all servers;
  step 3, transmitting sequentially a power-down instruction to the servers through the out-of-band network;
  step 4, waiting for a period of time until that the servers are in stable power-down, and acquiring a Link status value of an interface of an access chip in the power-down status of certain server;
  step 5, comparing the difference of the Link status values in step 2 and step 4, so as to acquire the corresponding relationship between the server and the interface of the cloud computing access device.

However, such method of acquiring the corresponding relationship between the server and the interface of the cloud computing access device is unreliable, and its obvious shortcomings are as follows:
  1) after the server is powered down, the status of the network card may still be Link status, therefore in this situation, the corresponding relationship cannot be identified, and a more complicated way is needed to acquire the corresponding relationship;
  2) some servers on the same cloud computing access device have been connected to the cloud computing network and sold to a customer; at this time, it is risky to power down a server;
  3) some servers on the same cloud computing access device may be sold to a user, therefore the corresponding relationship cannot be identified when a server is powered down and the user further powers down the service thereof;
  4) some servers on the same cloud computing access device may be sold to a user, therefore the corresponding relationship cannot be identified when a server is powered down and the user further powers on the service thereof;
  5) if a server for an interface of an access chip on the cloud computing access device is replaced, the mapping relationship will change, and a complicated operation and maintenance process is needed to deal with this situation.

Figure 6:
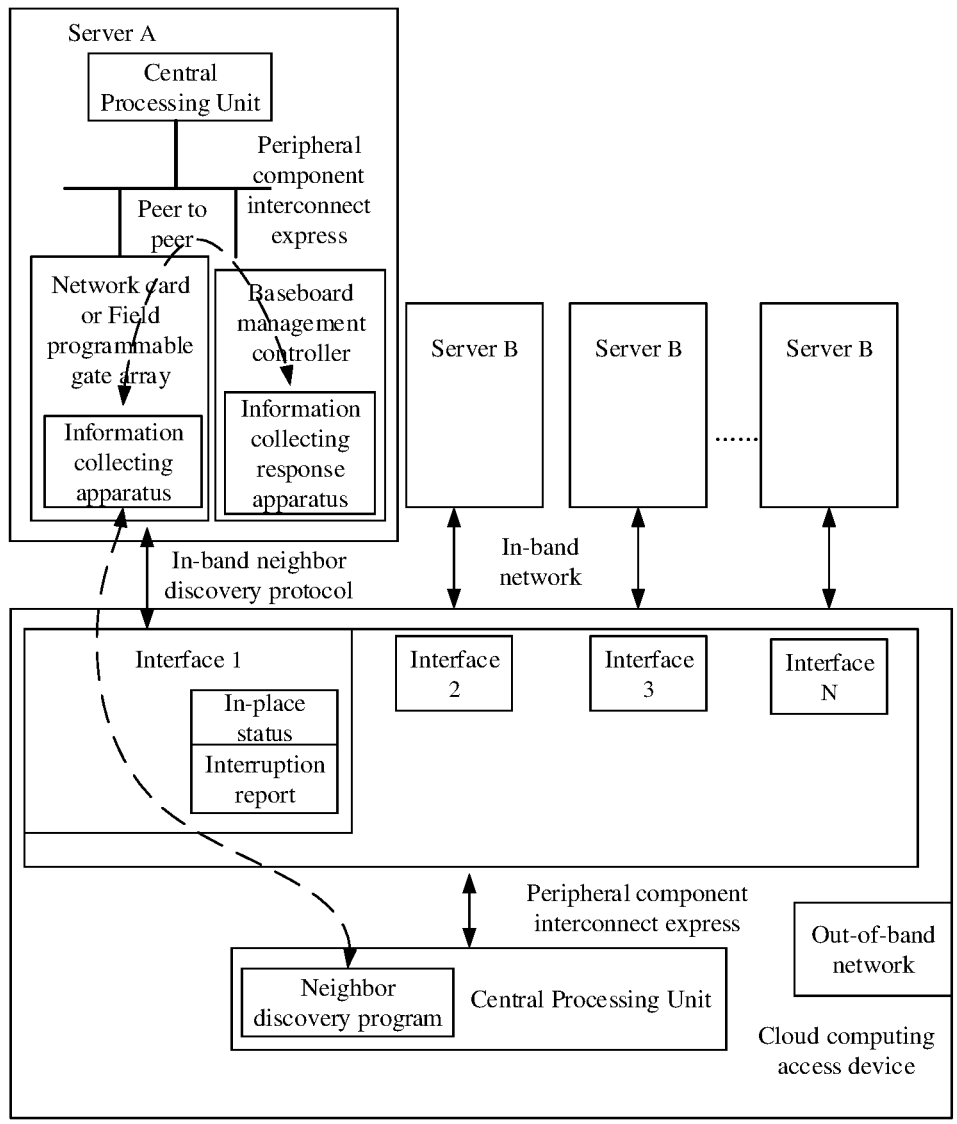
FIG. 6 is a schematic diagram of an apparatus for identifying interconnection information of an access device according to an embodiment of the present disclosure.

FIG. 6 is a schematic diagram of an apparatus for identifying interconnection information of an access device according to an embodiment of the present disclosure. As shown in FIG. 6, the network card or the FPGA is inserted into a PCIE slot of the server to connect with CPU so as to dock with the cloud computing access device. There is a BMC on the server for out-of-band management of the server and the BMC accesses CPU of the server through the PCIE; that is the network card or the FPGA and the BMC are all terminal nodes on the PCIE bus of the CPU, and Peer to Peer (P2P) communication can be implemented between the network card/FPGA and the BMC. There is an information collecting component on the network card or the FPGA, and there is key server information such as SN (Serial Number, used to identify a server) on the BMC. The cloud computing access device includes CPU and an access chip, and the access chip can be a switching chip, FPGA or CPU, etc. The access chip is connected with the CPU through the PCIE, and the access chip includes several interfaces for connecting with the server. The interface of the access chip includes modules such as for in-place status information of the server, interruption reporting and other modules, and the neighbor discovery program runs on the CPU.

The collecting process for the cloud computing access device to acquire the corresponding relationship between the server and the interface can be as follows:
  step 1, a server A is connected with a cloud computing access device;
  step 2, the server A is powered on, and a CPU of the server A scans a PCIE device to find a network card or an FPGA and a BMC;
  step 3, an information collecting component on the network card or the FPGA and the BMC communicates with each other through PCIE P2P to acquire server information recorded on the BMC and save it;

step 4, after the information collecting component on the network card or the FPGA collects the server information, the information involving server is actively notified to interface 1 of the access chip through the in-band neighbor discovery protocol;

step 5, after receiving the notification from the network card or the FPGA, the access chip notifies CPU in the form of interruption;

step 6, after receiving the interruption, the CPU on the cloud computing access device performs a neighbor discovery program, and the neighbor discovery program receives a message packet and parses it, thereby the server information is acquired;

step 7, the CPU on the cloud computing access device obtains information of the server A from the interface 1 of the access chip, if there is a mapping relationship for the interface 1 and the information of the server A is inconsistent with the current server information, a deletion will be made and a new mapping relationship between the interface 1 and the server A will be established; if there is no mapping relationship for the interface 1, a mapping relationship between the interface 1 and the server A will be directly established;

step 8, after receiving a response packet of the cloud computing access device, the information collecting apparatus of the network card or the FPGA of the server A records a status identifying the server information has been collected, and the server information will not be reported to the cloud computing access device after the server is hot restarted next time.

The server information mentioned in the above process specifically refers to SN information of the server. SN is used to uniquely identify a server, and the in-band neighbor discovery protocol is used for the CPU on the cloud computing access device to acquire the server information stored in the information collecting apparatus of the network card or the FPGA on the server. If a network card is installed on the server, the neighbor discovery protocol is a message interaction based on Ethernet. If an FPGA is installed on the server, the neighbor discovery protocol is a message interaction based on PCIE.

Figure 7:
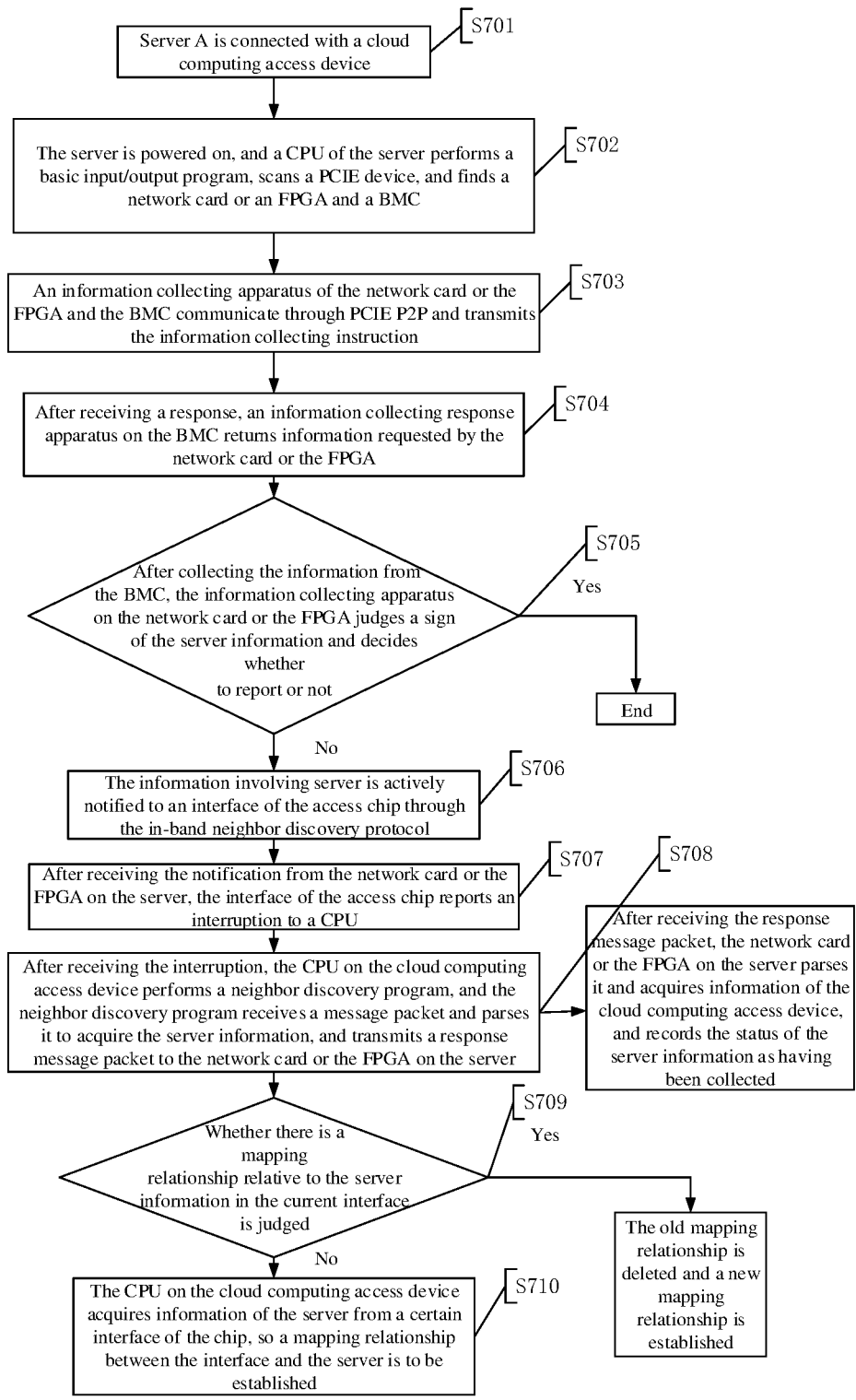
FIG. 7 is a flowchart of a method for identifying interconnection information of an access device according to an embodiment of the present disclosure.

FIG. 7 is a flowchart of a method for identifying interconnection information of an access device according to an embodiment of the present disclosure. As shown in FIG. 7, the method may include the following steps:

step S701: server A is connected with a cloud computing access device;

step S702, the server is powered on, and a CPU of the server performs a BIOS program, scans a PCIE device, and finds a network card or an FPGA and a BMC;

step S703: an information collecting apparatus of the network card or the FPGA and the BMC communicate through PCIE P2P and transmits an information collecting instruction;

step S704: after receiving a response, an information collecting response apparatus on the BMC returns information requested by the network card or the FPGA;

step S705: after collecting the information from the BMC, the information collecting apparatus on the network card or the FPGA judges a tag of the server information and decides whether to report or not.

step S706: if the judgment result in step S705 is no, the process ends; if the judgment result in step S705 is yes, it is performed that the information involving server is actively notified to an interface of the access chip through the in-band neighbor discovery protocol;

step S707: after receiving the notification from the network card or the FPGA on the server, the interface of the access chip reports an interruption to a CPU;

step S708: after receiving the interruption, the CPU on the cloud computing access device performs a neighbor discovery program, and the neighbor discovery program receives a message packet and parses it to acquire the server information, and transmits a response message packet to the network card or the FPGA on the server; after receiving the response message packet, the network card or the FPGA on the server parses it and acquires information of the cloud computing access device, and records the status of the server information as having been collected;

step S709, whether there is a mapping relationship relative to the server information in the current interface is judged;

step S710: if the judgment result in step S709 is yes, the old mapping relationship is deleted and a new mapping relationship is established: if the judgment result in step S709 is no, the CPU on the cloud computing access device acquires information of the server from a certain interface of the chip, so a mapping relationship between the interface and the server is to be established.

Figure 8:
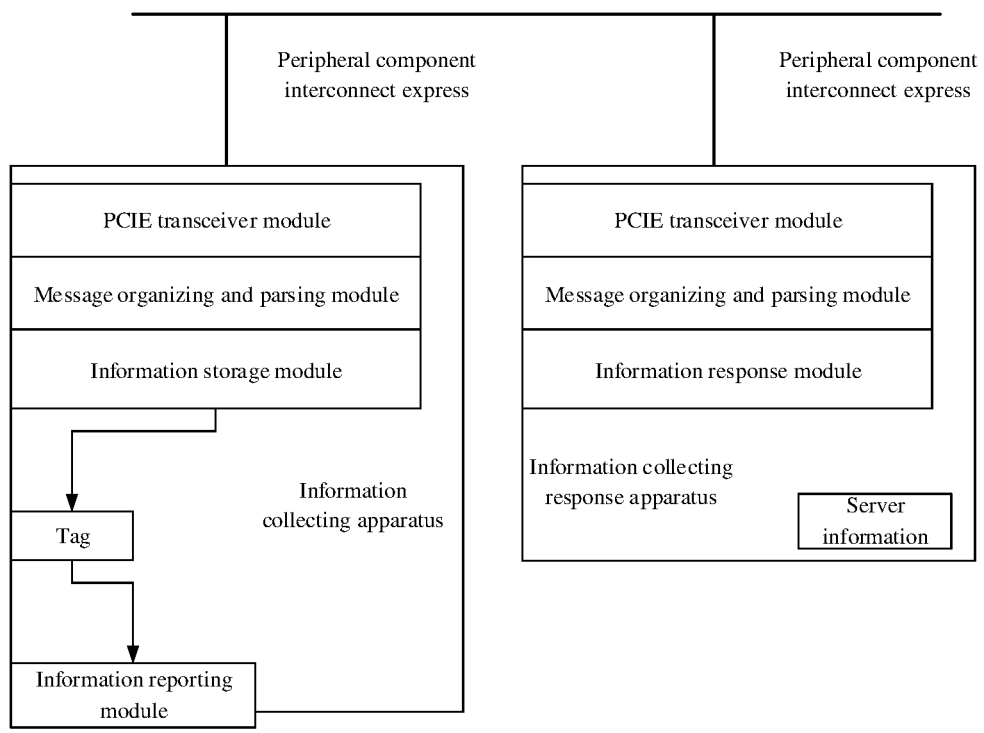
FIG. 8 is a schematic diagram of an information collecting apparatus and an information collecting response apparatus according to an embodiment of the present disclosure.

FIG. 8 is a schematic diagram of an information collecting apparatus and an information collecting response apparatus according to an embodiment of the present disclosure. As shown in FIG. 8, the information collecting apparatus of a network card or an FPGA on a server includes a PCIE transceiver module, a message organizing and parsing module, an information storage module and an information reporting module. The PCIE transceiver module is configured to receive and transmit a PCIE message. The message organizing and parsing module is configured to assemble and parse an information collecting message. When the network card or the FPGA collects server information, the module assembles a request message. When receiving a message returned by the information collecting response apparatus, the module parses a response message and extracts the server information. The information storage module is configured to store the server information parsed by the message organizing and parsing module in an apparatus, where a storage medium for the server information can be a nonvolatile storage such as an electrically erasable programmable read only memory (EEPROM for short) and a flash memory. At the same time, the information storage module is configured to record a tag indicating whether the server information has been successfully collected or not. A storage medium for the tag can be a volatile storage such as a dynamic random access memory (DRAM for short). The information reporting module is configured to report the collected server information to the cloud computing access device. Before reporting, the tag of the server information will be judged. If the tag indicates that the server information has been collected, it will not be reported again, and if it has not been collected, it will be reported.

The tag is stored in a volatile storage. If the server is hot restarted and the network card/FPGA is not powered off, the statue is remained: if the server is cold restarted such as after being powered off, the status disappearing is tagged, and the server information will still be reported to the cloud computing access device after the server is powered on next time. In this way, the frequent reporting of server information can be avoided, and the change of mapping relationship can further be taken into account in the case of server relocation.

In an embodiment of the present disclosure, the information collecting apparatus is added in the network card or the FPGA, and the information collecting response apparatus is added in the BMC, in which way the information interaction between the network card or the FPGA and the BMC is implemented. By recording the server information collecting tag in a volatile storage, the frequent reporting of server information is avoided, and the changes of the mapping relationship under various situations such as server relocation can be taken into account, so that it is no longer necessary to power down the server and collecting of a mapping relationship is automatically realized, thus solving the technical problem of low efficiency in establishing the mapping relationship between the server and the access device and achieving the technical effect of improving the efficiency in establishing the mapping relationship between the server and the access device.

Embodiment 3

According to an embodiment of the present disclosure, there is further provided a data processing apparatus for implementing the data processing method shown in FIG. 2.

Figure 9:
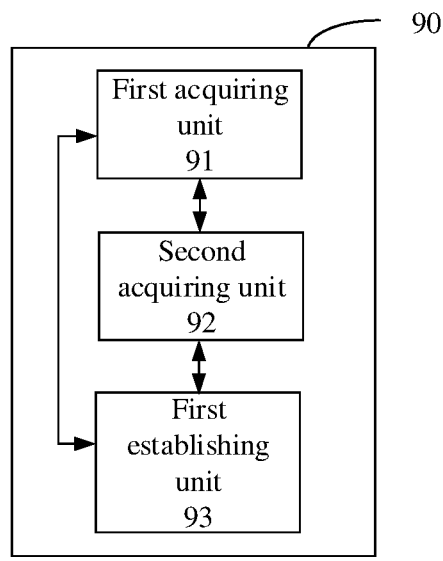
FIG. 9 is a schematic diagram of a data processing apparatus provided from a server side according to an embodiment of the present disclosure.

FIG. 9 is a schematic diagram of a data processing apparatus provided from a server side according to this embodiment. As shown in FIG. 9, the data processing apparatus 90 may include a first acquiring unit 91, a second acquiring unit 92, and a first establishing unit 93.

A first acquiring unit 91 is configured to acquire first identification information of a first server, where the first identification information is used to identify the first server.

A second acquiring unit 92 is configured to acquire status information of the first server based on the first identification information, where the status information is used to indicate whether the first identification information has been collected by a target interface of an access device.

The first establishing unit 93 is configured to transmit the first identification information to the target interface in response to the status information indicating that the first identification information has not been collected by the target interface, so as to establish a first mapping relationship between the first server and the target interface based on the first identification information.

It should be noted here that the first acquiring unit 91, the second acquiring unit 92 and the first establishing unit 93 correspond to steps S202 to S206 in Embodiment 1, and the three units are the same as the example and application scenario implemented by the corresponding steps, but are not limited to the contents disclosed in Embodiment 1. It should be noted that the above-mentioned unit can run in the computer terminal 10 provided in Embodiment 1 as a part of the apparatus.

Alternatively, the first establishing unit 93 includes a prohibiting module and a first transmitting module, where the prohibiting module may include a prohibiting sub-module. The prohibiting module is configured to prohibit the first identification information from being transmitted to the target interface in response to the status information indicating that the first identification information has been collected by the target interface. The first transmitting module is configured to transmit the first identification information to the target interface in response to the first server being in a cold restart status and the status information indicating that the first identification information has not been collected by the target interface. The prohibiting sub-module is configured to prohibit the first identification information from being transmitted to the target interface in response to the first server being in a hot restart status and retaining the status information indicating that the first identification information has been collected by the target interface.

Alternatively, the first acquiring unit 91 includes a second transmitting module and a second acquiring module, where the second transmitting module may include a second transmitting sub-module and the second acquiring module may include a second acquiring sub-module, where the second transmitting sub-module may include a second transmitting sub-unit. The second transmitting module is configured to transmit an information collecting instruction to a target controller of the first server; the second acquiring module is configured to acquire the first identification information returned by the target controller in response to the information collecting instruction; the second transmitting sub-module is configured to transmit the information collecting instruction to the target controller in a network card or a processor of the first server based on peer to peer communication between the network card or the processor of the first server and the target controller; the second acquiring sub-module is configured to receive the first identification information returned by the target controller in response to the information collecting instruction based on the peer to peer communication in the network card or the processor; the second transmitting sub-unit is configured to transmit the first identification information to the target interface through a target protocol based on a target message interaction protocol where if a network card is disposed in the first server, the target message interaction protocol is a message protocol for interaction based on Ethernet; if a processor is disposed in the first server, the target message interaction protocol is a message protocol for interaction based on a target serial bus.

Alternatively, the second acquiring unit 92 includes a third acquiring module. The third acquiring module is configured to store the first identification information into a memory and seek out a status information corresponding to the first identification information in the memory.

Alternatively, the apparatus further includes a receiving module and an updating module. The receiving module is configured to receive a response result returned by the access device, where the response result is used to indicate that the first identification information has been collected by the target interface. The updating module is configured to update the status information based on the response result, where the status information updated is used to indicate that the first identification information has been collected by the target interface.

In the above embodiment of the present disclosure, the first identification information of the first server is acquired by the first acquiring unit 91, where the first identification information is used to identify the first server: the second acquiring unit 92 acquires the status information of the first server based on the first identification information where the status information is used to indicate whether the first identification information has been collected by the target interface of the access device; the first establishing unit 93, in response to the status information indicating that the first identification information has not been collected by the target interface, transmits the first identification information to the target interface to establish the first mapping relationship between the first server and the target interface based on the first identification information. That is, by collecting the identification information of the server, recording whether the identification information of the server has been collected by the target interface of the access device, furthermore, transmitting the identification information to the target interface to establish the mapping relationship between the target interface and the server, the collecting is automatic since operation of the server to be powered down isn't necessary, so that the efficiency in establishing the mapping relationship between the server and the access device is improved, thereby solving the technical problem of low efficiency in establishing the mapping relationship between the server and the access device and achieving the technical effect of improving the efficiency in establishing the mapping relationship between the server and the access device.

According to an embodiment of the present disclosure, there is further provided a data processing apparatus for implementing the data processing method shown in FIG. 3.

Figure 10:
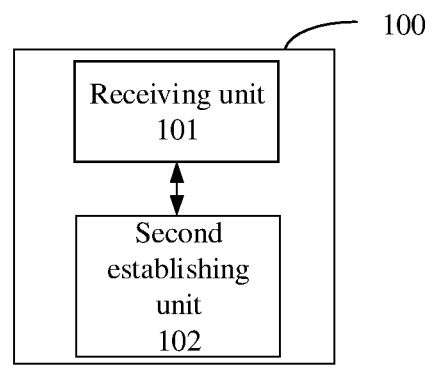
FIG. 10 is a schematic diagram of a data processing apparatus provided from an access device side according to an embodiment of the present disclosure.

FIG. 10 is a schematic diagram of a data processing apparatus provided from an access device side according to an embodiment of the present disclosure. As shown in FIG. 10, the data processing apparatus 100 may include a receiving unit 101 and a second establishing unit 102.

The receiving unit 101 is configured to receive first identification information of a first server, where the first identification information is used to identify the first server and the first identification information has not been collected by a target interface of an access device but sent by the first server:

The second establishing unit 102 is configured to establish a first mapping relationship between the first server and the target interface based on the first identification information.

Alternatively, the second establishing unit 102 includes a first establishing sub-module and a second establishing sub-module. The first establishing sub-module is configured to delete a second mapping relationship and establish the first mapping relationship between the first server and the target interface in response to there being the second mapping relationship between the target interface and the second server and second identification information of the second server corresponding to the second mapping relationship is different from the first identification information, where the second identification information is used for identifying the second server. The second establishing sub-module is configured to establish the first mapping relationship between the first server and the target interface in response to there being no second mapping relationship between the target interface and the second server.

Alternatively, the receiving unit 101 includes a receiving sub-unit. The receiving sub-unit is configured to receive the first identification information based on a target message interaction protocol, where if a network card is disposed in the first server, the target message interaction protocol is a message protocol for interaction based on Ethernet: if a processor is disposed in the first server, the target message interaction protocol is a message protocol for interaction based on a target serial bus.

It should be noted here that the receiving unit 101 and the second establishing unit 102 correspond to steps S302 to S304 in Embodiment 1 and the two units are the same as the example and application scenario implemented by the corresponding steps, but are not limited to the contents disclosed in Embodiment 1. It should be noted that the above-mentioned unit can run in the computer terminal 10 provided in Embodiment 1 as a part of the apparatus.

Embodiment 4

According to an embodiment of the present disclosure, there is further provided a data processing system for performing the data processing method of an embodiment of the present disclosure.

Figure 11:
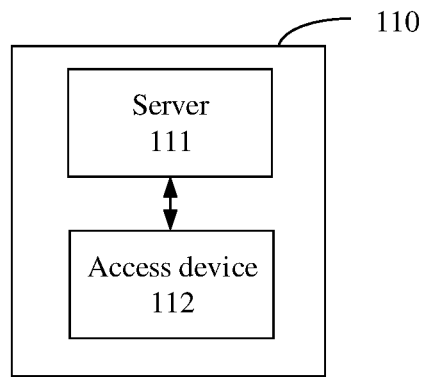
FIG. 11 is a schematic diagram of a data processing system provided according to an embodiment of the present disclosure.

FIG. 11 is a schematic diagram of a data processing system provided according to an embodiment of the present disclosure. As shown in FIG. 11, the data processing system 110 may include a server 111 and an access device 112.

The server 111 is configured to acquire identification information, acquire status information of the server based on the identification information, and transmit the identification information to a target interface in response to the status information indicating that the identification information has not been collected by the target interface of the access device, where the identification information is used to identify the server:

The access device 112 is configured to receive the identification information and establish a first mapping relationship between the server and the target interface based on the identification information having been received by the target interface and further based on the identification information.

In an alternative embodiment provided by the present application, the server may include an information collecting apparatus.

The information collecting apparatus is disposed in a network card or a programmable logic gate array FPGA of the server, and transmits an information collecting instruction to a baseboard management controller BMC of the server. The BMC may include an information collecting response apparatus configured to respond to the information collecting instruction and return the obtained identification information to the network card or the FPGA.

In the above embodiment of the present disclosure, the server 111 acquires the identification information, acquires the status information of the server based on the identification information, and transmits the identification information to the target interface in response to the status information indicating that the identification information has not been collected by the target interface of the access device, where the identification information is used to identify the server. The access device 112 receives the identification information based on the target interface, establishes the first mapping relationship between the server and the target interface based on the identification information, and the information collecting apparatus is added in the network card or the FPGA and the information collecting response apparatus is added in the BMC to complete the information interaction between the network card or the FPGA and the BMC, thus improving the efficiency in establishing the mapping relationship between the server and the access device, thus solving the technical problem of low efficiency in establishing the mapping relationship between the server and the access device and achieving the technical effect of improving the efficiency in establishing the mapping relationship between the server and the access device.

Embodiment 5

An embodiment of the present disclosure further provides a computer-readable storage medium. Alternatively, in this embodiment, the storage medium can be configured to store program code executed by the data processing method provided in the Embodiment 1.

Alternatively, in this embodiment, the storage medium can be located in any one computer terminal in a computer terminal group in a computer network or in any one mobile terminal in a mobile terminal group.

Alternatively, in this embodiment, the storage medium is configured to store program code for performing the following steps: acquiring first identification information of a first server, where the first identification information is used for identifying the first server: acquiring status information of the first server based on the first identification information, where the status information is used for indicating whether the first identification information has been collected by a target interface of an access device: in response to the status information indicating that the first identification information has not been collected by the target interface, transmitting the first identification information to the target interface to establish a first mapping relationship between the first server and the target interface based on the first identification information.

Alternatively, the computer-readable storage medium is further configured to store program code for performing the following steps: in response to the status information indicating that the first identification information has been collected by the target interface, prohibiting the first identification information from being transmitted to the target interface.

Alternatively, the computer-readable storage medium is further configured to store program code for performing the following steps: in response to the first server being in a hot restart status and retaining status information being used to indicating that the first identification information has been collected by the target interface, prohibiting the first identification information from being transmitted to the target interface.

Alternatively, the computer-readable storage medium is further configured to store program code for performing the following steps: in response to the first server being in a cold restart status and the status information being used to indicate that the first identification information has not been collected by the target interface, transmitting the first identification information to the target interface.

Alternatively, the computer-readable storage medium is further configured to store program code for performing the following steps: transmitting an information collecting instruction to a target controller of the first server: acquiring the first identification information returned by the target controller in response to the information collecting instruction.

Alternatively, the computer-readable storage medium is further configured to store program code for performing the following steps: transmitting an information collecting instruction to a target controller of a first server includes: in a network card or a processor of the first server, transmitting the information collecting instruction to the target controller based on peer to peer communication between the network card or the processor of the first server and the target controller: acquiring the first identification information returned by the target controller in response to the information collecting instruction includes: in the network card or the processor, receiving the first identification information returned by the target controller in response to the information collecting instruction based on the peer to peer communication.

Alternatively, the computer-readable storage medium is further configured to store program code for performing the following steps: transmitting the first identification information to the target interface through a target protocol based on a target message interaction protocol, where if a network card is disposed in the first server, the target message interaction protocol is a message protocol for interaction based on Ethernet: if a processor is disposed in the first server, the target message interaction protocol is a message protocol for interaction based on a target serial bus.

Alternatively, the computer-readable storage medium is further configured to store program code for performing the following steps: storing the first identification information in the memory, and seeking out the status information corresponding to the first identification information in the memory.

Alternatively, the computer-readable storage medium is further configured to store program code for performing the following steps: receiving a response result returned by the access device, where the response result is used to indicate that the first identification information has been collected by the target interface: updating the status information based on the response result, where the updated status information is used to indicate that the first identification information has been collected by the target interface.

As an alternative example, the computer-readable storage medium is further configured to store program code for performing the following steps: receiving first identification information of a first server, where the first identification information is used for identifying the first server and the first identification information has not been collected by a target interface of an access device but sent by the first server; establishing a first mapping relationship between the first server and the target interface based on the first identification information.

Alternatively, the computer-readable storage medium is further configured to store program code for performing the following steps: in response to there being a second mapping relationship between the target interface and the second server, and second identification information of the second server corresponding to the second mapping relationship is different from the first identification information, deleting the second mapping relationship and establishing a first mapping relationship between the first server and the target interface, where the second identification information is used for identifying the second server: or in response to there being no second mapping relationship between the target interface and the second server, establishing the first mapping relationship between the first server and the target interface.

Alternatively, the computer-readable storage medium is further configured to store program code for performing the following steps: receiving the first identification information based on a target message interaction protocol, where if a network card is disposed in the first server, the target message interaction protocol is a message protocol for interaction based on Ethernet: if a processor is disposed in the first server, the target message interaction protocol is a message protocol for interaction based on a target serial bus.

Embodiment 6

An embodiment of the present disclosure may provide a data processing system, which may include a computer terminal, and the computer terminal may be any one computer terminal device in a computer terminal group. Alternatively, in this embodiment, the computer terminal can further be replaced by a terminal device such as a mobile terminal.

Alternatively, in this embodiment, the computer terminal may be located in at least one network device among a plurality of network devices of a computer network.

In this embodiment, the computer terminal can execute program code of the following steps in the data processing method of an embodiment of the present disclosure: acquiring first identification information of a first server, where the first identification information is used to identify the first server: acquiring status information of the first server based on the first identification information, where the status information is used for indicating whether the first identification information has been collected by a target interface of an access device: in response to the status information indicating that the first identification information has not been collected by the target interface, transmitting the first identification information to the target interface to establish a first mapping relationship between the first server and the target interface based on the first identification information.

Figure 12:
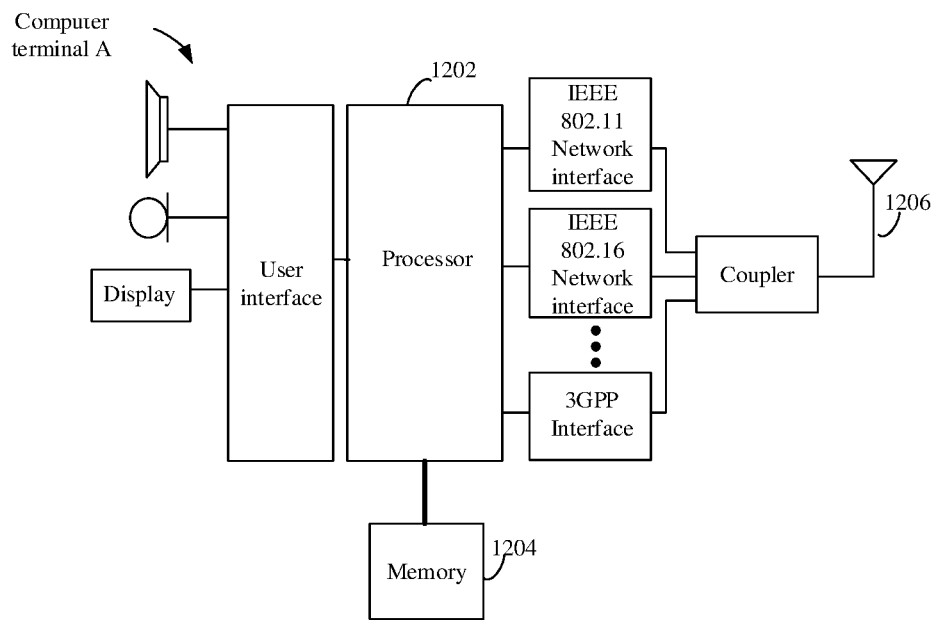
FIG. 12 is a structural block diagram of a computer terminal according to an embodiment of the present disclosure.

Alternatively, FIG. 12 is a structural block diagram of a computer terminal according to an embodiment of the present disclosure. As shown in FIG. 12, the computer terminal A may include one or more (only one is shown) processors 1202, a memory 1204, and a transmission apparatus 1206.

The memory can be configured to store a software program and a module, such as program instruction/module corresponding to the data processing method and apparatus in an embodiment of the present disclosure, and the processor executes various functional applications and data processing by running the software program and module stored in the memory, that is, the above data processing method is implemented. The memory may include high-speed random access memory and non-volatile memory, such as one or more magnetic storage apparatuses, flash memory, or other non-volatile solid-state memory. In some examples, the memory may further include memories remotely arranged with respect to the processor, and these remote memories may be connected to the computer terminal A through a network. Examples of the above network include, but are not limited to, the Internet, an intranet, a local area network, a mobile communication network, and a combination thereof.

The processor can call the information and the application program stored in the memory through the transmission apparatus to perform the following steps: acquiring the first identification information of the first server, where the first identification information is used for identifying the first server: acquiring the status information of the first server based on the first identification information, where the status information is used for indicating whether the first identification information has been collected by the target interface of the access device: in response to the status information indicating that the first identification information has not been collected by the target interface, transmitting the first identification information to the target interface to establish the first mapping relationship between the first server and the target interface based on the first identification information.

Alternatively, the processor can further execute the program code of the following steps: in response to the status information indicating that the first identification information has been collected by the target interface, prohibiting the first identification information from being transmitted to the target interface.

Alternatively, the processor can further execute the program code of the following steps: in response to the first server being in a hot restart status and retaining the status information indicating that the first identification information has been collected by the target interface, prohibiting the first identification information from being transmitted to the target interface.

Alternatively, the processor can further execute the program code of the following steps: in response to the first server being in a cold restart status, and the status information is used to indicate that the first identification information has not been collected by the target interface, transmitting the first identification information to the target interface.

Alternatively, the processor can further execute the program code of the following steps: transmitting the information collecting instruction to the target controller of the first server: acquiring the first identification information returned by the target controller in response to the information collecting instruction.

Alternatively, the processor can further execute the program code of the following steps: transmitting the information collecting instruction to the target controller of the first server includes: in the network card or the processor of the first server, transmitting the information collecting instruction to the target controller based on the peer to peer communication between the network card or the processor of the first server and the target controller: acquiring the first identification information returned by the target controller in response to the information collecting instruction includes: in the network card or the processor, receiving the first identification information returned by the target controller in response to the information collecting instruction based on the peer to peer communication.

Alternatively, the processor can further execute the program code of the following steps: transmitting the first identification information to the target interface through the target protocol based on the target message interaction protocol, where if a network card is disposed in the first server, the target message interaction protocol is a message protocol for interaction based on Ethernet: if a processor is disposed in the first server, the target message interaction protocol is a message protocol for interaction based on a target serial bus.

Alternatively, the processor can further execute the program code of the following steps: storing the first identification information in the memory, and seeking out the status information corresponding to the first identification information in the memory.

Alternatively, the processor can further execute the program code of the following steps: receiving the response result returned by the access device, where the response result is used to indicate that the first identification information has been collected by the target interface: updating the status information based on the response result, where the updated status information is used to indicate that the first identification information has been collected by the target interface.

As an alternative example, the processor can further execute the program code of the following steps: receiving the first identification information of the first server, where the first identification information is used to identify the first server and the first identification information has not been collected by the target interface of the access device but sent by the first server: establishing the first mapping relationship between the first server and the target interface based on the first identification information.

Alternatively, the processor can further execute the program code of the following steps: in response to there being a second mapping relationship between the target interface and the second server, and second identification information of the second server corresponding to the second mapping relationship is different from the first identification information, deleting the second mapping relationship and establishing the first mapping relationship between the first server and the target interface, where the second identification information is used to identify the second server: or in response to there being no second mapping relationship between the target interface and the second server, establishing the first mapping relationship between the first server and the target interface.

Alternatively, the processor can further execute the program code of the following steps: receiving the first identification information based on a target message interaction protocol, where if a network card is disposed in the first server, the target message interaction protocol is a message protocol for interaction based on Ethernet: if a processor is disposed in the first server, the target message interaction protocol is a message protocol for interaction based on a target serial bus.

By adopting an embodiment of the present application, a data processing scheme is provided. Acquiring the first identification information of the first server, where the first identification information is used for identifying the first server; acquiring the status information of the first server based on the first identification information, where the status information is used for indicating whether the first identification information has been collected by the target interface of the access device; in response to the status information indicating that the first identification information has not been collected by the target interface, transmitting the first identification information to the target interface to establish the first mapping relationship between the first server and the target interface based on the first identification information, so that the efficiency in in establishing the mapping relationship between the server and the access device, thus solving the technical problem of low efficiency in establishing the mapping relationship between the server and the access device and achieving the technical effect of improving the efficiency in establishing the mapping relationship between the server and the access device.

Those skilled in the art can understand that the structure shown in FIG. 12 is only schematic, and the computer terminal A can further be a terminal device such as a smart phone (e.g. an Android phone, an iOS phone, etc.), a tablet computer, a palmtop computer and a mobile internet device (MID) and a PAD. FIG. 12 does not limit the structure of the computer terminal A described above. For example, the computer terminal A may further include more or fewer components (such as a network interface, a displaying apparatus, etc.) than shown in FIG. 12, or has a different configuration from that shown in FIG. 12.

Those skilled in the art can understand that all or part of the steps in the various methods of the above embodiments can be performed by instructing a hardware related to the terminal device through a program, and the program can be stored in a computer-readable storage medium. The storage medium can include a flash drive, a read-only memory (ROM), a random access memory (RAM), a magnetic disk or an optical disk, etc.

The serial numbers of the above embodiments of the present disclosure are only for description and do not represent the embodiment being more preferred or not.

In the above-mentioned embodiments of the present disclosure, the description of each embodiment has its own emphasis. For the parts not detailed in one embodiment, please refer to the related descriptions of other embodiments.

In several embodiments provided by the present application, it should be understood that the disclosed technical contents can be implemented in other ways. The apparatus embodiment described above is only schematic, for example, the division of the units is only a logical function division, and there may be another division way in actual implementation, for example, multiple units or components can be combined or integrated into another system, or some features can be ignored or not implemented. On the other hand, the mutual coupling or direct coupling or communication connection shown or discussed can be indirect coupling or communication connection through some interfaces, units or modules, which can be electrical or other forms.

The unit described as a separate component may or may not be physically separated, and the component described as a unit may or may not be a physical unit, that is, they may be located in one place or distributed in multiple network units. Some or all of the units can be selected according to actual needs to achieve the purpose of the embodiment.

In addition, each functional unit in each embodiment of the present disclosure may be integrated into one processing unit, or each unit may exist physically alone, or two or more units may be integrated into one unit. The above integrated units can be implemented in the form of a hardware or a software functional unit.

The integrated unit can be stored in a computer-readable storage medium if it is implemented in the form of a software functional unit and sold or used as an independent product. Based on this understanding, the technical solution the present disclosure, the part that essentially contributes to the existing technology or all or part of the technical solution, can be implemented in the form of a software product, and the computer software product is stored in a storage medium and includes several instructions to make a computer device (such as a personal computer, a server or a network device) perform all or part of the steps of the method according to various embodiments of the present disclosure. The aforementioned storage medium include: a USB disk, a read-only memory (ROM), a random access memory (RAM), a removable hard disk, a magnetic disk or an optical disk and other medium that can store program code.

The above is only the preferred implementation of the present disclosure, and it should be pointed out that a person skilled in the art can make several improvements and embellishments without departing from the principle of the present disclosure, and these improvements and embellishments should also be regarded as falling in the protection scope of the present disclosure.

The invention claimed is:

1. A data processing method, comprising:
acquiring first identification information of a first server, wherein the first identification information is used for identifying the first server;
acquiring status information of the first server based on the first identification information, wherein the status information is used to indicate whether the first identification information has been collected by a target interface of an access device; and
in response to the status information indicating that the first identification information has not been collected by the target interface, transmitting the first identification information to the target interface to establish a first mapping relationship between the first server and the target interface based on the first identification information.

2. The method according to claim 1, wherein the method further comprises:
in response to the status information indicating that the first identification information has been collected by the target interface, prohibiting the first identification information from being transmitted to the target interface.

3. The method according to claim 2, wherein the in response to the status information indicating that the first identification information has been collected by the target interface, prohibiting the first identification information from being transmitted to the target interface comprises:
 in response to the first server being in a hot restart status and retaining the status information indicating that the first identification information has been collected by the target interface, prohibiting the first identification information from being transmitted to the target interface.

4. The method according to claim 3, wherein after transmitting the first identification information to the target interface, the method further comprises:
 receiving a response result returned by the access device, wherein the response result is used to indicate that the first identification information has been collected by the target interface; and
 updating the status information based on the response result, wherein the updated status information is used to indicate that the first identification information has been collected by the target interface.

5. The method according to claim 2, wherein after transmitting the first identification information to the target interface, the method further comprises:
 receiving a response result returned by the access device, wherein the response result is used to indicate that the first identification information has been collected by the target interface; and
 updating the status information based on the response result, wherein the updated status information is used to indicate that the first identification information has been collected by the target interface.

6. The method according to claim 1, wherein the in response to the status information indicating that the first identification information has not been collected by the target interface, transmitting the first identification information to the target interface comprises:
 in response to the first server being in a cold restart status, and the status information indicating that the first identification information has not been collected by the target interface, transmitting the first identification information to the target interface.

7. The method according to claim 6, wherein after transmitting the first identification information to the target interface, the method further comprises:
 receiving a response result returned by the access device, wherein the response result is used to indicate that the first identification information has been collected by the target interface; and
 updating the status information based on the response result, wherein the updated status information is used to indicate that the first identification information has been collected by the target interface.

8. The method according to claim 1, wherein the acquiring first identification information of a first server comprises:
 transmitting an information collecting instruction to a target controller of the first server; and
 acquiring the first identification information returned by the target controller in response to the information collecting instruction.

9. The method according to claim 8, wherein
 the transmitting an information collecting instruction to a target controller of the first server comprises: in a network card or a processor of the first server, transmitting the information collecting instruction to the target controller based on peer to peer communication between the network card or the processor of the first server and the target controller; and
 the acquiring the first identification information returned by the target controller in response to the information collecting instruction comprises: in the network card or the processor, receiving the first identification information returned by the target controller in response to the information collecting instruction based on the peer to peer communication.

10. The method according to claim 9, wherein the transmitting the first identification information to the target interface comprises:
 transmitting the first identification information to the target interface through a target protocol based on a target message interaction protocol, wherein if the network card is disposed in the first server, the target message interaction protocol is a message protocol for interaction based on Ethernet; if the processor is disposed in the first server, the target message interaction protocol is a message protocol for interaction based on a target serial bus.

11. The method according to claim 1, wherein the acquiring status information of the first server based on the first identification information comprises:
 storing the first identification information into a memory, and seeking out the status information corresponding to the first identification information in the memory.

12. The method according to claim 1, wherein after transmitting the first identification information to the target interface, the method further comprises:
 receiving a response result returned by the access device, wherein the response result is used to indicate that the first identification information has been collected by the target interface; and
 updating the status information based on the response result, wherein the updated status information is used to indicate that the first identification information has been collected by the target interface.

13. A non-transitory computer-readable storage medium, comprising a program, wherein when the program is run by a processor, a device where the non-transitory computer-readable storage medium is located is controlled to perform the data processing method according to claim 1.

14. A data processing system, comprising a processor; a memory connected with the processor and configured to provide an instruction for the processor to perform the data processing method according to claim 1.

15. A data processing method, comprising:
 receiving first identification information of a first server, wherein the first identification information is used for identifying the first server and the first identification information has not been collected by a target interface of an access device but sent by the first server; and
 establishing a first mapping relationship between the first server and the target interface based on the first identification information.

16. The method according to claim 15, wherein the establishing a first mapping relationship between the first server and the target interface based on the first identification information comprises:
 in response to there being a second mapping relationship between the target interface and a second server, and second identification information of the second server corresponding to the second mapping relationship is different from the first identification information, deleting the second mapping relationship and establishing the first mapping relationship between the first server and the target interface, wherein the second identification information is used for identifying the second server; or in response to there being no second mapping relationship between the target interface and a second server, establishing the first mapping relationship between the first server and the target interface.

17. The method according to claim 15, wherein the receiving first identification information of a first server comprises:

receiving the first identification information based on a target message interaction protocol, wherein if a network card is disposed in the first server, the target message interaction protocol is a message protocol for interaction based on Ethernet; if a processor is disposed in the first server, the target message interaction protocol is a message protocol for interaction based on a target serial bus.

18. A non-transitory computer-readable storage medium, comprising a program, wherein when the program is run by a processor, a device where the non-transitory computer-readable storage medium is located is controlled to perform the data processing method according to claim 15.

19. A data processing system, comprising a server and an access device, wherein the server is configured to acquire identification information, acquire status information of the server based on the identification information, and transmits the identification information to a target interface in response to the status information indicating that the identification information has not been collected by the target interface of the access device, wherein the identification information is used for identifying the server;

the access device is configured to establish a first mapping relationship between the server and the target interface based on the identification information having been received by the target interface and further based on the identification information.

20. The system according to claim 19, wherein the server comprises:

an information collecting apparatus, configured to be disposed in a network card or a programmable logic gate array FPGA of the server and transmit an information collecting instruction to a baseboard management controller BMC of the server;

wherein the BMC comprises an information collecting response apparatus configured to in response to the information collecting instruction, return the identification information to the network card or the FPGA.

* * * * *